April 8, 1958     E. J. STOCKER     2,829,902
SLED
Filed May 25, 1955
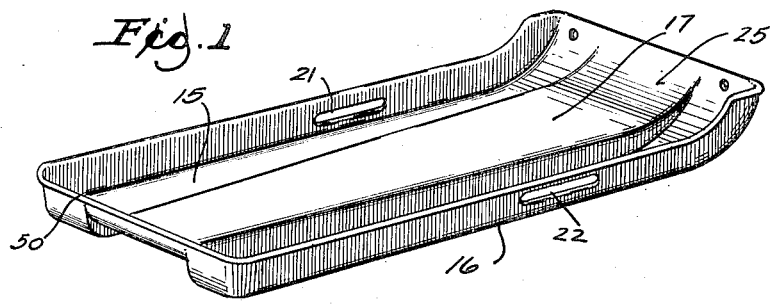
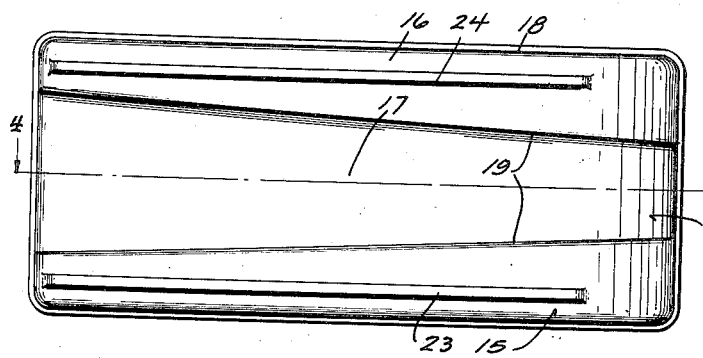
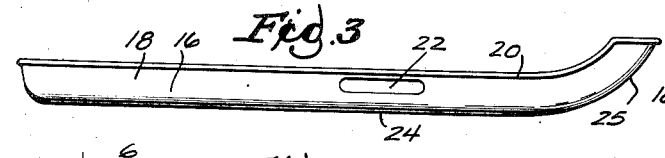
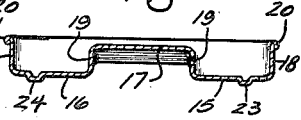
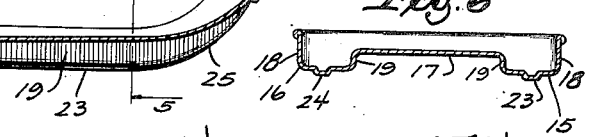
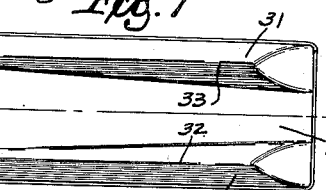
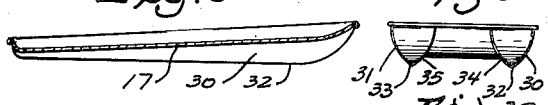
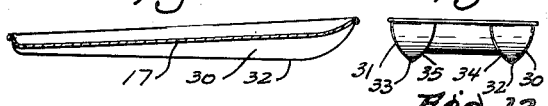
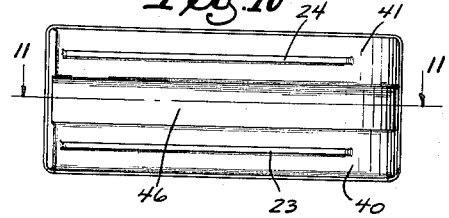
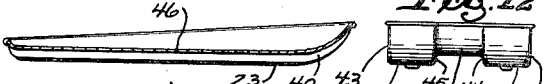
INVENTOR.
ELMER J. STOCKER
BY
Wheeler, Wheeler & Wheeler
ATTORNEYS

United States Patent Office

2,829,902
Patented Apr. 8, 1958

2,829,902

SLED

Elmer J. Stocker, Milwaukee, Wis.

Application May 25, 1955, Serial No. 510,997

7 Claims. (Cl. 280—18)

My invention relates to improvements in a sled.

More particularly stated, my invention relates to improvements in a vehicle for use principally on snow surfaces and combining features to improve support of the user or of the load which the sled bears; such features including modifications of previously known vehicles, so as to combine characteristics of a sled and a toboggan. At the same time, my sled is adaptable to low cost production wherein a single sheet of suitable material is formed substantially in one operation.

Another feature of my invention involves the molding of a single sheet of light gauge material into spaced, runner equipped, pontoon configurations with a sloping planiform toboggan-like area therebetween, whereby without sacrifice of means for directional control, to provide greater load bearing capacity over relatively light fluffy snow.

In the drawings:

Fig. 1 is a perspective of a preferred form of my sled, the view being taken from slightly above the right rear corner thereof.

Fig. 2 is a bottom view of the sled shown in Fig. 1.

Fig. 3 is a side elevational view of the sled shown in Fig. 1.

Fig. 4 is a section on line 4—4 of Fig. 2.

Fig. 5 is a section on line 5—5 of Fig. 4.

Fig. 6 is a section on line 6—6 of Fig. 4.

Fig. 7 is a bottom view of an embodiment of an alternative form of my invention.

Fig. 8 is a section on line 8—8 of Fig. 7.

Fig. 9 is a front view of the sled shown in Fig. 7.

Fig. 10 is a bottom view of an embodiment of a second alternative form of my invention.

Fig. 11 is a section on line 11—11 of Fig. 10.

Fig. 12 is a front view of the sled shown in Fig. 10.

The preferred form of my invention shown in Figs. 1 to 6 inclusive is probably best formed of a single sheet of aluminum, although, obviously, it may be made of other materials, such as molded plastics, Fiberglas, or other formable or moldable substances. For the purposes of this description, I shall divide the sled into three principal portions denominated left pontoon 15, right pontoon 16 and a toboggan portion 17 between the two pontoons. In using the word pontoon, I am, of course, using the term loosely to indicate a portion of a sled which has great supporting capacity upon loose snow by reason of the boat-like cross-sectional contours as seen in Figs. 5, 6, 9, and 12 and thus distinguished from the usual sled "runner" which in soft snow would cut deeply and would not have contours to float the sled.

The cross-sectional configuration of the pontoons in the preferred embodiment of my invention shown in Figs. 1 to 6 inclusive will be seen to provide relatively straight side walls 18 on the outside of each pontoon and side walls of relatively less height at 19 providing inner walls which merge into toboggan portion 17. When the entire sled is formed of one sheet of material, the outer margins are rolled as at 20 to provide not only a comfortable handhold when the sled is picked up by the user, but also to stiffen the entire structure of the sled. The provision of marginally beaded openings at 21 and 22 to provide additional handholds is a matter of choice since the total weight of my sled is inconsiderable and the mere grasping of the margin and bead at 20 is adequate for the lifting of a sled, the weight of which seldom exceeds five pounds.

Each of the pontoons in the preferred forms of my invention tapers from a broadest channel shape at the forward end to a narrower channel shape at the rear end, and each of the pontoons has a bottom surface which is boat-like rather than runner or blade-like.

Since a boat-like bottom contour of the pontoon portions of my sled has less "grip" of the snow to prevent side slip, I provide parallel formed ribs 23 and 24 as relatively narrow snow engaging members in straight line directional control. These act to a certain degree as runners, but because of their limited vertical dimension, they are more nearly like the keel of a boat. It will be noted that the outside walls 18 are parallel and that the inside walls 19 are divergent rearwardly. As a result of this, the toboggan-like central portion 17 is wider rearwardly than it is at the front where both the toboggan portion and the pontoons have their surfaces curved upwardly to provide a prow 25.

The toboggan portion 17, it only provides an area which increases in width rearwardly, but it is slanted downwardly from the front toward the rear of the sled as shown most clearly in Figs. 4, 5, and 6. It may be said, therefore, that the inner walls 19 of the pontoons 15 and 16 and the toboggan 17 taken in conjunction with a surface upon which the sled is supported provide a tunnel which, viewed from the front of the sled as in Fig. 5, rearwardly widens in its lateral dimension and is of decreasing vertical dimension. In any event, since the side walls 19 are not apertured, any snow in the tunnel cannot escape laterally or upwardly; and to the extent that the snow tends to maintain its position and resist packing, a lifting moment is applied to the sled. As applied to the contours of the under surfaces of the sled shown in Figs. 1 to 6 inclusive and as shown in the sled construction described below and shown in Figs. 10 to 12, the term two stage toboggan is applicable. Each of the pontoons presents toboggan-like lower surfaces with contours differing from the contour of the central portion 17.

An alternative construction of a sled intended for manufacture out of a single sheet of material is shown in Figs. 7, 8 and 9 where it will be seen that pontoon portions 30 and 31 do not require a rib, such as the ribs 23 or 24, since in cross-section, as seen in Fig. 9, these pontoons are spherically triangular shaped in cross section with their lowermost portions sufficiently sharp to provide parallel track forming lines 32 and 33. The central portion is of practically identical configuration and contour to the central portion 17 in the Fig. 1 construction, and it has been denominated 17 in this Fig. 7 construction. Of course, the inner walls 34—35 of the pontoons in the Fig. 7 construction are downwardly and outwardly tapered from their lines of juncture with the central toboggan portion 17. This alternative sled as shown in Figs. 7, 8 and 9 is somewhat more dirigible than the construction shown in the other sled constructions shown in the drawings.

In Figs. 10, 11, and 12, I have shown a modification of the preferred construction shown in Figs. 1 to 6 inclusive. Here a set of pontoons 40 and 41 are not tapered rearwardly but have parallel side walls 42 and 43 at their outside surfaces and 44—45 at their inside surfaces with the result that the central toboggan portion 46 is not tapered rearwardly. Furthermore, the central toboggan portion 46 is parallel throughout its length with the surface contacting portions of the pontoons (see Fig. 11). There is less "planing" action.

The stern portions of the various sleds shown in Figs. 1 to 12 are merely rounded out in the most expeditious way in view of the problems of metal drawing encountered in this art. It will be noted that the pontoons and the central portion swing upwardly to a rear margin 50 which is rolled or beaded as desired.

I claim:

1. A sled including integrally a central longitudinal sheet of plane material merged laterally at either side thereof into downwardly and outwardly configured pontoon shaped supporting runners of substantial width, said supporting runners being provided with upwardly extending lateral margins, the longitudinal sheet and runners being oppositely tapered, with the longitudinal sheet being wider at its rearward end, and the supporting runners being wider at their forward ends.

2. The sled of claim 1 wherein a supporting runner has a guiding rib extending longitudinally along its lower surface.

3. The sled of claim 1 wherein the central sheet and the supporting runners have upwardly curved surfaces defining their forward ends.

4. The sled of claim 1 wherein the merger of the central sheet and one of said supporting runners comprises a juncture along a substantially straight line which is closer to the supporting surface at the rearward portion of the sled, providing however an upturned forward portion in sled runner contour.

5. The sled of claim 1 wherein the merger of the central sheet and one of said supporting runners comprises a juncture along a substantially straight line which slopes downwardly rearwardly whereby a substance such as snow traversed by the forwardly moving sled is received between the supporting runners in a tunnel which rearwardly flattens and widens.

6. The device of claim 1 in which said runners are spherically triangular in cross section.

7. The device of claim 1 in which the longitudinal sheet is sloped rearwardly downwardly along the runner.

References Cited in the file of this patent

UNITED STATES PATENTS

| | | |
|---|---|---|
| 359,741 | Pusey | Mar. 22, 1887 |
| 2,219,905 | Prickman | Oct. 29, 1940 |
| 2,389,729 | Howland | Nov. 27, 1945 |
| 2,460,021 | Manthey | Jan. 25, 1949 |
| 2,635,452 | Harris | Apr. 21, 1953 |
| 2,667,996 | Fanelli | Feb. 2, 1954 |

FOREIGN PATENTS

| | | |
|---|---|---|
| 65,227 | Norway | Sept. 14, 1942 |
| 80,599 | Sweden | June 5, 1934 |
| 255,835 | Switzerland | Feb. 1, 1949 |

U. S. DEPARTMENT OF COMMERCE
PATENT OFFICE

CERTIFICATE OF CORRECTION

Patent No. 2,829,902 April 8, 1958

Elmer J. Stocker

It is hereby certified that error appears in the printed specification of the above numbered patent requiring correction and that the said Letters Patent should read as corrected below.

Column 2, line 27, for "it" read -- not --.

Signed and sealed this 20th day of May 1958.

(SEAL)
Attest:

KARL H. AXLINE
Attesting Officer

ROBERT C. WATSON
Commissioner of Patents